(12) United States Patent
Robbins et al.

(10) Patent No.: US 6,229,106 B1
(45) Date of Patent: May 8, 2001

(54) CIRCUIT BREAKER MOVEMENT STRUCTURE WITH THREE POSITION LOCKING MECHANISM

(75) Inventors: W. Dale Robbins, Lithonia; James H. Blessitt, Peachtree City; Russell B. Green, Douglasville, all of GA (US)

(73) Assignee: Siemens Energy Automation, Inc., Alpharetta, GA (US)

( * ) Notice: Subject to any disclaimer, the term of this patent is extended or adjusted under 35 U.S.C. 154(b) by 0 days.

(21) Appl. No.: 09/434,438

(22) Filed: Nov. 5, 1999

(51) Int. Cl.[7] ..................................................... H01H 9/20
(52) U.S. Cl. ........................................ 200/50.21; 200/318
(58) Field of Search .............................. 200/17 R, 50.01, 200/50.21–50.26, 500, 501, 318–327, 43.01, 43.16, 43.19; 361/600, 615, 605–610

(56) References Cited

U.S. PATENT DOCUMENTS

| | | | |
|---|---|---|---|
| 4,914,549 | 4/1990 | Leone et al. | 361/336 |
| 5,036,427 | * 7/1991 | Krom et al. | 361/339 |
| 5,278,722 | * 1/1994 | Peruso | 361/606 |
| 5,337,210 | * 8/1994 | Ishikawa et al. | 361/608 |
| 5,837,949 | 11/1998 | Green et al. | 200/50.21 |
| 6,031,192 | * 2/2000 | Liebetruth | 200/50.21 |
| 6,066,814 | * 5/2000 | Smith et al. | 200/50.24 |

* cited by examiner

Primary Examiner—Michael Friedhofer

(57) ABSTRACT

A circuit breaker movement (10) structure is provided for use with a circuit breaker (12) to move the circuit breaker be connected with or be disconnected from a circuit breaker connecting apparatus (14). The movement structure comprises a draw bracket assembly (68) and (70) constructed and arranged to be mounted to the circuit breaker connecting apparatus. A guide assembly (16) is constructed and arranged to be mounted to the circuit breaker (12). The draw bracket assembly includes drive structure constructed and arranged to be actuated to engage the guide assembly and cause the circuit breaker to move with respect to the circuit breaker connecting apparatus. The draw bracket assembly includes a movable structure (108) coupled thereto so as to be moved in a linear manner between first, second, and third positions while maintaining the movable structure in one of the positions. The movable structure (108) is constructed and arranged such that: In the first position, the movable structure (108) permits the circuit breaker (12) to be initially connected with or be disconnected from the circuit breaker connecting apparatus (14), and prevents actuation of the drive structure (94). In the second position, the movable structure (108) prevents the circuit breaker (12) to be connected with or be disconnected from the circuit breaker connecting apparatus (14), and prevents actuation of the drive structure (94). In the third position, the moveable structure (108) permits the circuit breaker (12) to be connected with or be disconnected from the circuit breaker connecting apparatus (14) but prevents the circuit breaker from being completely disengaged with respect to the draw bracket assembly (68) and (70), and the movable structure (108) permits actuation of the drive structure (94).

23 Claims, 7 Drawing Sheets

FIG. 7A
FIG. 7B
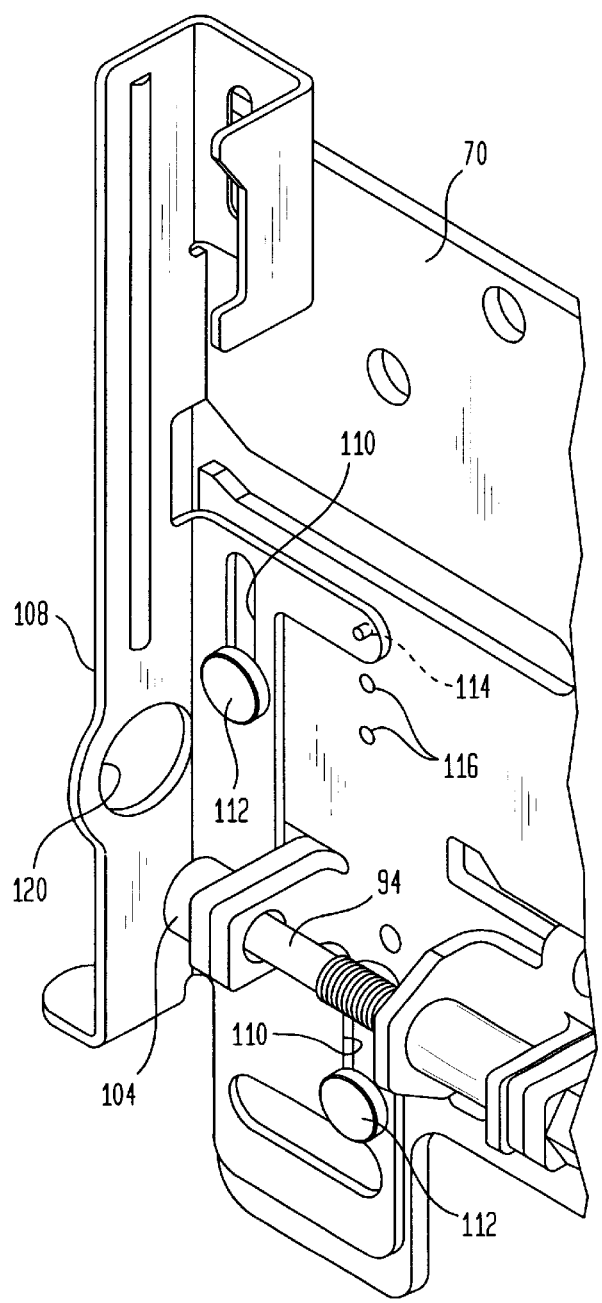
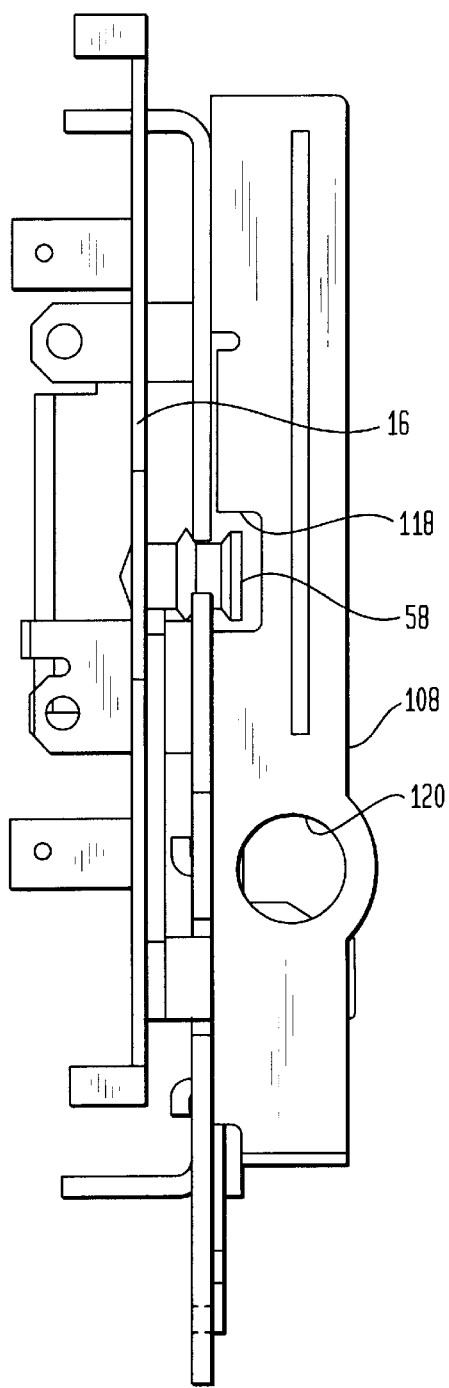

FIG. 8A
FIG. 8B
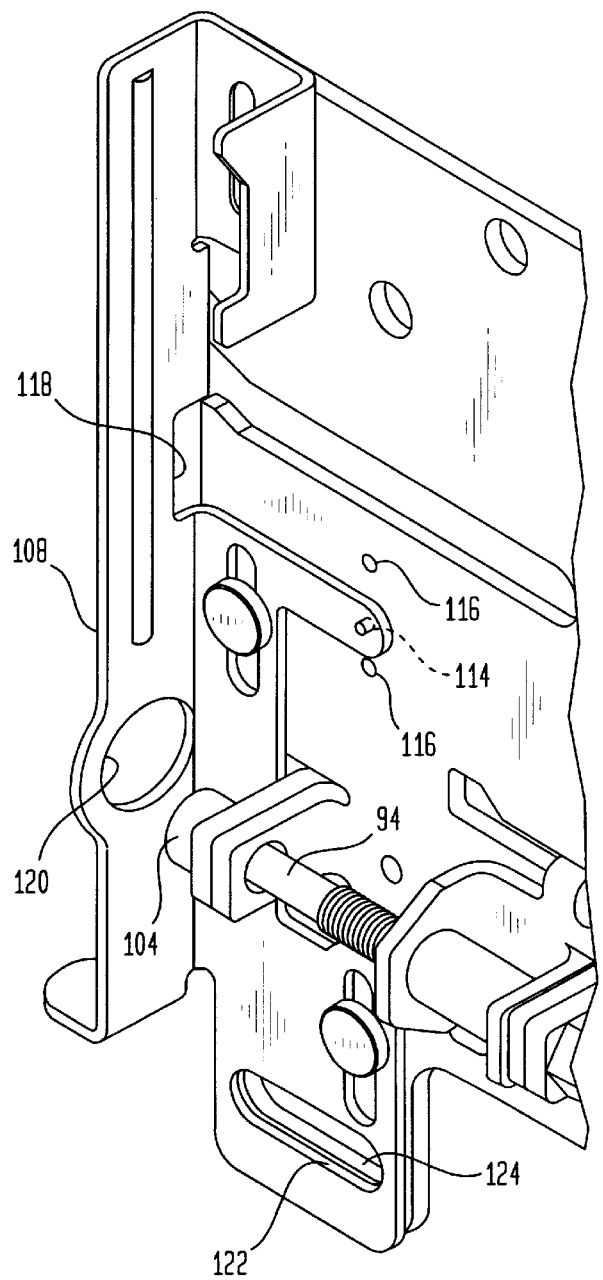
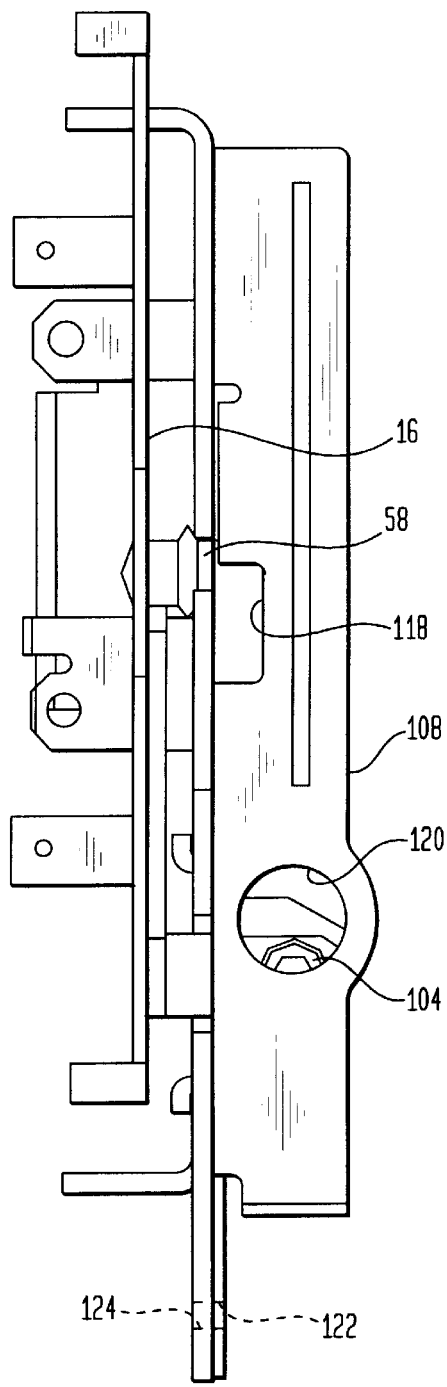

FIG. 9A
FIG. 9B
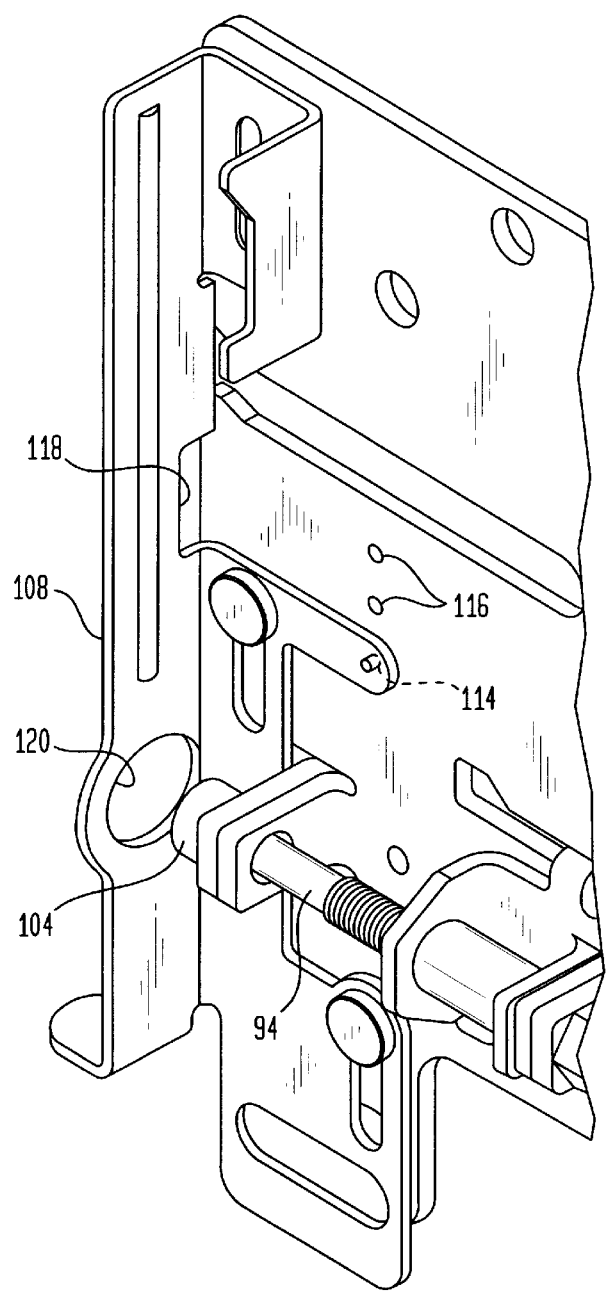
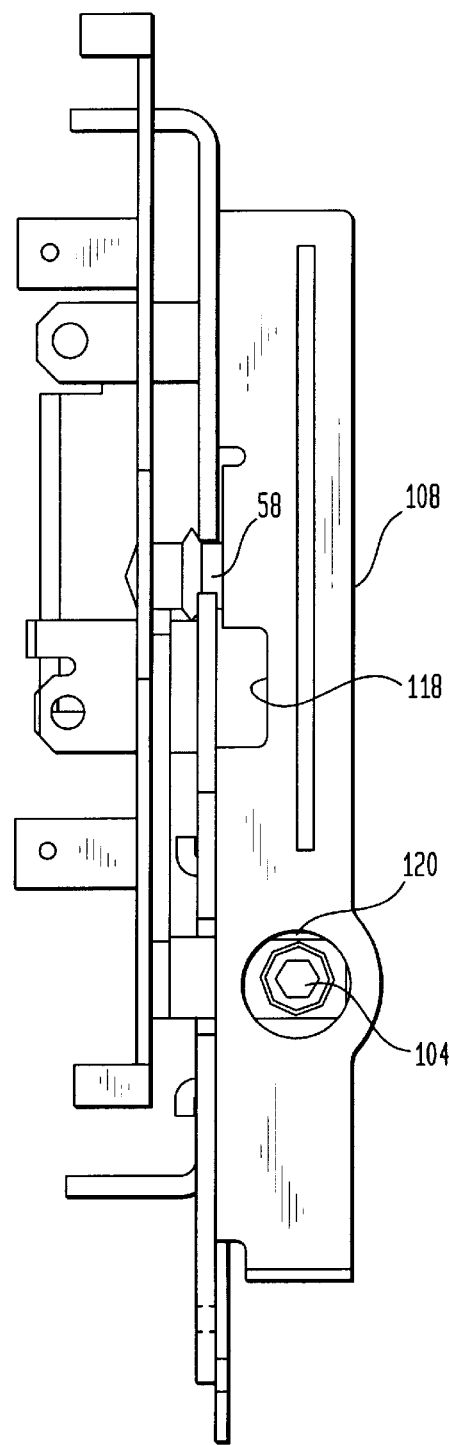

CIRCUIT BREAKER MOVEMENT STRUCTURE WITH THREE POSITION LOCKING MECHANISM

BACKGROUND OF THE INVENTION

The present invention relates to a circuit breaker draw-withdraw apparatus for use with a circuit breaker to move the circuit breaker so as to be connected to or be disconnected from a plug-in base.

Conventionally, a plug-in base for a circuit breaker is mounted on a panel board or other base structure and is wired to circuitry on the base structure. A circuit breaker is installed in the plug-in base by inserting stabs protruding from the circuit breaker into jaws fixed to the plug-in base. The jaw/stab connection provides the primary electrical connection between the circuit breaker and the plug-in base. This connection may also mechanically retain the circuit breaker in the plug-in base.

Withdraw mechanisms have been developed for mechanically drawing a circuit breaker into a plug-in base and withdrawing the circuit breaker from the plug-in base. An example of such a withdraw mechanism is disclosed in U.S. Pat. No. 5,837,949 to Green et al. The withdraw mechanism described in Green et al. is operated by rotating a screw linkage using a drive tool inserted into the front of the withdraw mechanism which draws the circuit breaker into or withdraws the circuit breaker from the plug-in base. This type of mechanism is advantageous since a circuit breaker unit having a high amperage rating is heavy and thus is difficult for a technician to position properly in the plug-in base by hand. In addition, the jaws in a high amp plug-in base may require a high insertion force, making it difficult or impossible for a technician to apply sufficient force to fully insert the stabs into the jaws.

A circuit breaker withdraw mechanism typically includes a component attached to the plug-in base and a component attached to the circuit breaker. Installation of the withdraw mechanism may take place in the field, in a supplier warehouse or at the circuit breaker production plant. Accordingly, there is a need to ensure that attachment of the withdraw mechanism be simple and fool-proof.

SUMMARY OF THE INVENTION

An object of the invention is to fulfill the need referred to above. In accordance with the principles of the present invention, this objective is achieved by providing a circuit breaker movement structure for use with a circuit breaker to move the circuit breaker to be connected with or be disconnected from a circuit breaker connecting apparatus. The movement structure comprises a draw bracket assembly constructed and arranged to be mounted to the circuit breaker connecting apparatus. A guide assembly is constructed and arranged to be mounted to the circuit breaker. The draw bracket assembly includes drive structure constructed and arranged to be actuated to engage the guide assembly and cause the circuit breaker to move with respect to the circuit breaker connecting apparatus. The draw bracket assembly includes a movable structure coupled thereto so as to be moved in a linear manner between first, second, and third positions while maintaining the movable structure in one of the positions. The movable structure is constructed and arranged such that:

in the first position, the movable structure permits the circuit breaker to be initially connected with or be disconnected from the circuit breaker connecting apparatus, and prevents actuation of the drive structure, in the second position, the movable structure prevents the circuit breaker to be connected with or be disconnected from the circuit breaker connecting apparatus, and prevents actuation of the drive structure, and in the third position, the moveable structure permits the circuit breaker to be connected with or be disconnected from the circuit breaker connecting apparatus but prevents the circuit breaker from being completely disengaged with respect to the draw bracket assembly, and the movable structure permits actuation of the drive structure.

In accordance with another aspect of the invention, a method of controlling operation of a circuit breaker movement structure is provided.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

Preferred embodiments of the invention are described in greater detail herein below with reference to the drawings wherein:

FIG. 7A is a perspective view of a three position movable rail of the active draw bracket of the movement structure of the invention shown in a first position thereof;

FIG. 7B is a front view of the three position movable rail of FIG. 7A;

FIG. 8A is a perspective view of a three position movable rail of the active draw bracket of the movement structure of the invention shown in a second position thereof;

FIG. 8B is a front view of the three position movable rail of FIG. 8A;

FIG. 9A is a perspective view of a three position movable rail of the active draw bracket of the movement structure of the invention shown in a third position thereof; and FIG. 9B is a front view of the three position movable rail of FIG. 9A.

DETAILED DESCRIPTION OF THE PREFERRED EMBODIMENTS

Figure 1:
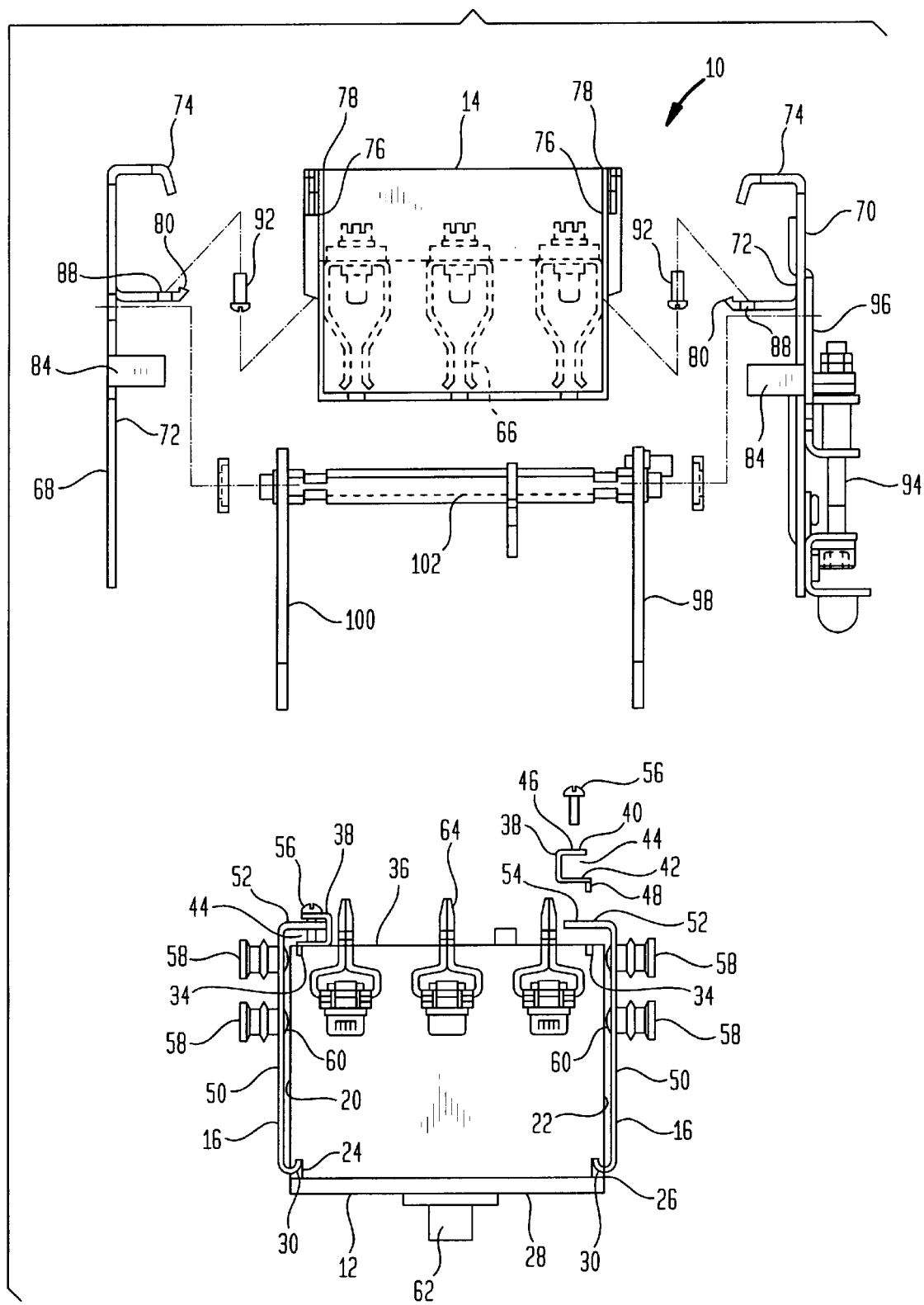
FIG. 1 is a plan and partially exploded view of a circuit breaker movement structure provided in accordance with the principles of the present invention.

With reference to FIG. 1, a circuit breaker movement structure, generally indicated at 10, is provided in accordance with the principles of the present invention. The circuit breaker movement structure is used with a circuit breaker 12 to move the circuit breaker 12 so as to be connected with or be disconnected from a circuit breaker connecting apparatus or plug-in base 14. The movement structure 10 includes a guide assembly comprising a pair of guide brackets 16 constructed and arranged to be mounted adjacent to sides 20 and 22, respectively, of the circuit breaker 12. In the illustrated embodiment, the circuit breaker includes a pair of slots 24 and a pair of slots 26 generally at the front portion 28 thereof. Each guide bracket 16 includes a pair of hook-shaped ends 30 with one hooked-shaped end 30 being received in an associated slot 24 and 26. In addition, four slots 34 are formed at the rear end 36 of the circuit breaker 12. A pair of retainer members 38 is associated with each guide bracket 16. As best shown in the exploded portion of FIG. 1, each retainer member 38 is generally C-shaped having first and second legs 40 and 42 disposed in spaced relation defining an opening 44 therebetween. The first leg 40 includes an aperture 46 therein. The second leg 42 includes a protrusion 48 extending generally transversely with respect thereto. Each of the second slots 34 is constructed to receive the protrusion 48 of an associated retainer member 38 to retain the rear portion of the associated guide bracket 16 with respect to the circuit breaker 12. Each guide bracket 16 has a portion 50 extending adjacent to a side of the circuit breaker 12 and has a flange 52 disposed transversely with respect to the extending portion 50 and disposed in the opening 44 of the retainer member 38. The flange 52 of each guide bracket includes a threaded aperture 54 therein such that a fastener 56 may be inserted through the aperture 46 in the first leg 40 of the retainer member 38 and through the threaded aperture 54 of the flange 52. The end of the fastener 56 engages the second leg 42 and forces the second leg 42 against the rear surface 36 of the circuit breaker 12, maintaining the protrusion 48 in the slot 34.

Each guide bracket 16 includes a pair of guide posts 58 which are attached to the associated guide bracket by rivets 60. The guide posts 58 may be attached in such a manner to enable rotation of the guide posts 58 with respect to the associated guide bracket 16 to define rollers. The guide posts 58 are used to guide and support the circuit breaker 12 when being drawn into or withdrawn from the plug-in base 14, as will be explained more fully below.

The circuit breaker 12 includes a toggle handle 62 and copper stabs 64 extending therefrom to be received by contact jaws 66 in the plug-in base 14 so as to electrically connect and mechanically mount the circuit breaker 12 to the plug-in base 14.

Figure 2:
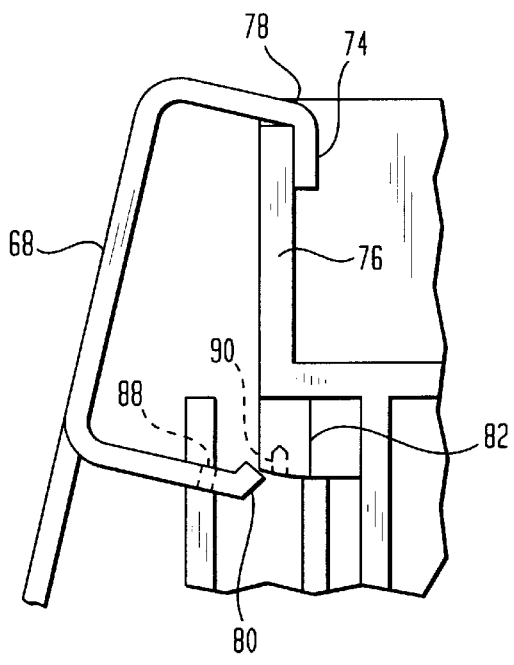
FIG. 2 is an enlarged partial plan view of hook structure of a draw bracket being joined to a plug-in base of the movement structure of FIG. 1.
Figure 3:
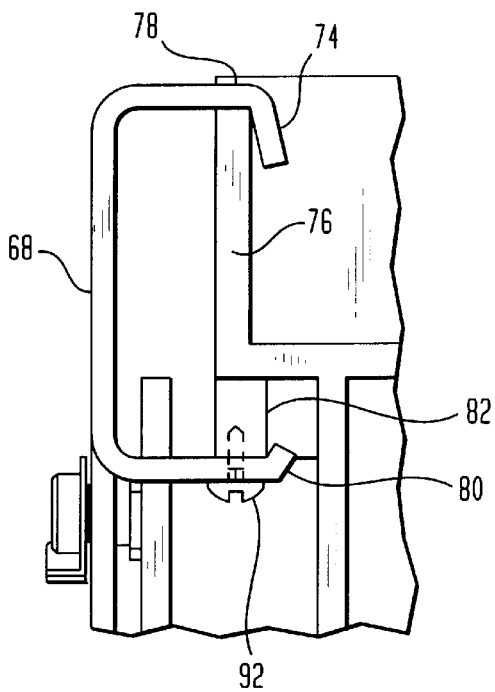
FIG. 3 is an enlarged partial plan view the hook structure of FIG. 2 joined to the plug-in base.
Figure 4:
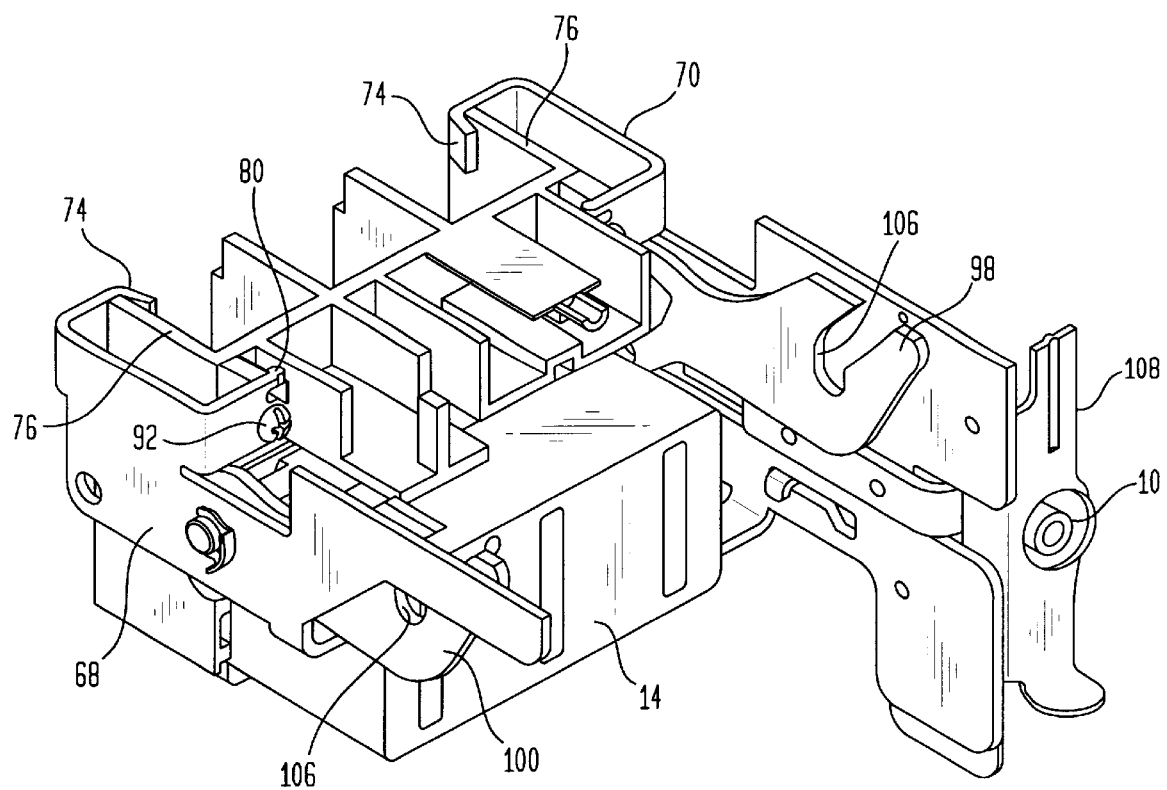
FIG. 4 is a perspective view of a lower portion of a plug-in base and draw bracket assembly of the movement structure of FIG. 1, the upper portion thereof being cut-away for clarity of illustration.

The movement structure 10 also includes components attached to the plug-in base 14. These components are shown in an exploded view in FIG. 1. Thus, the movement structure 10 includes a draw bracket assembly comprising a pair of draw brackets 68 and 70. Each draw bracket 68 and 70 has a generally planar portion 72 and a hook structure 74 at a rear end thereof. As best shown in FIGS. 1–4, the plug-in base 14 includes a pair of walls 76 extending therefrom to defining a slot structure 78 for receiving an associated hook structure 74. With reference to FIGS. 2–4, each draw bracket 68 and 70 includes a detent 80 for engaging a surface 82 near the front of the plug-in base 14. In addition, a stand-off tab 84 is provided for spacing the associated draw bracket 68, 70 from the associated side of the plug-in base 14.

With reference to FIGS. 2–4, to install the draw bracket 68 to the plug-in base 14, the hook structure 74 is first engaged with the slot structure 78 in the rear of the plug-in base 14. The draw bracket 68 is then rotated about the hook structure 74 until the detent 80 engages the front surface 82 of the plug-in base 14 in an interference fit, locking the draw bracket 68 in position on the plug-in base 14. Rotation of the draw bracket 68 is continued until the stand-off tab 84 abuts surface 86 (FIG. 6) of the plug-in base 14. In this position, a hole 88 in the draw bracket 68 is aligned with a hole 90 in the plug-in base 14 and a screw 92 is provided in the holes 88 and 90 to complete the assembly. Hole 90 may be threaded or may be a smooth hole and a thread cutting screw can be employed. The draw bracket 70 is installed in the same manner to the opposite side of the plug-in base 14. This snap-on arrangement advantageously permits correct and precise installation of the draw brackets in the field by a single technician without the use of special tools or fixtures.

Figure 5:
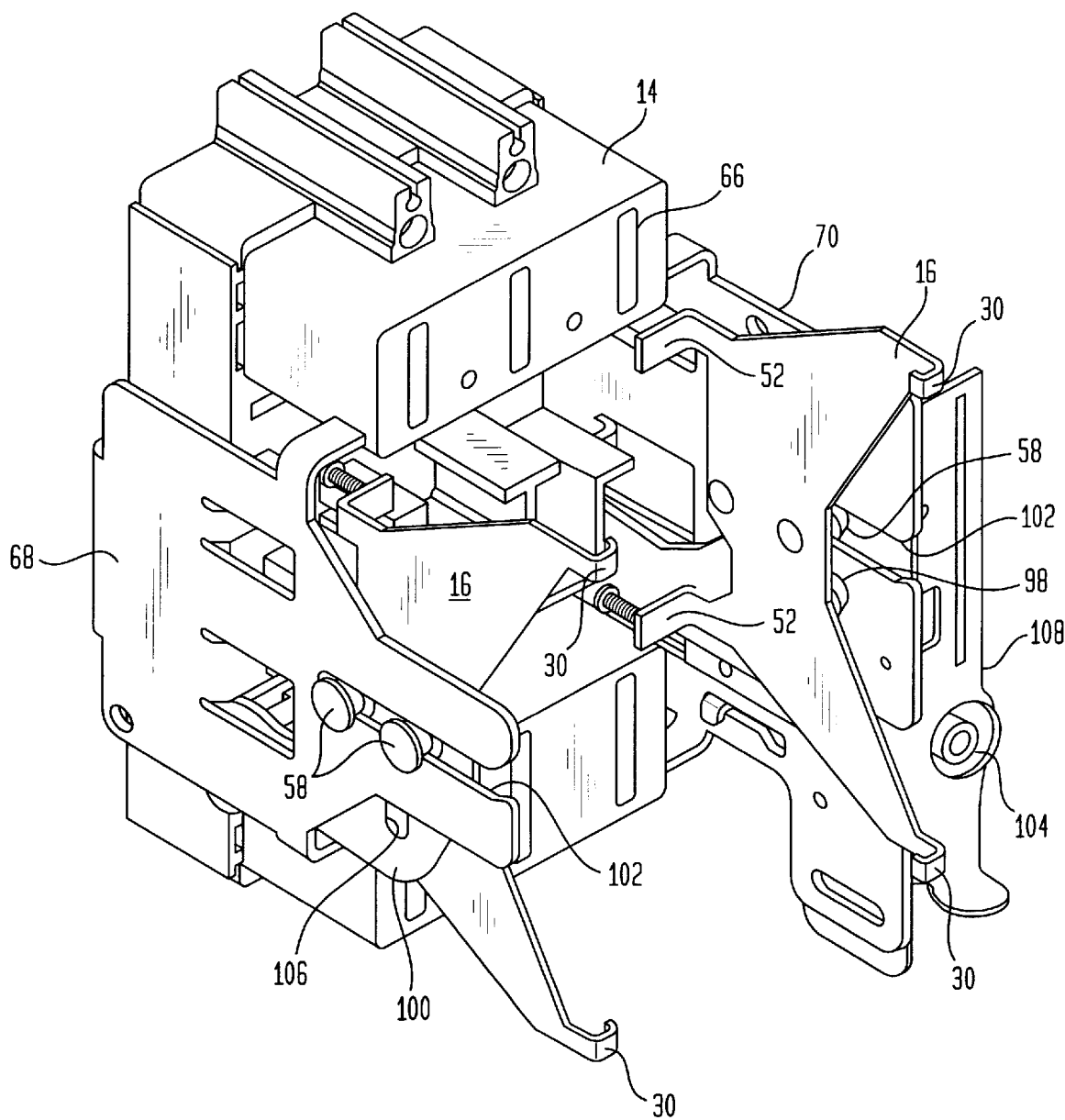
FIG. 5 is a front perspective view of the movement structure of the invention, shown with the circuit breaker removed for clarity of illustration.
Figure 6:
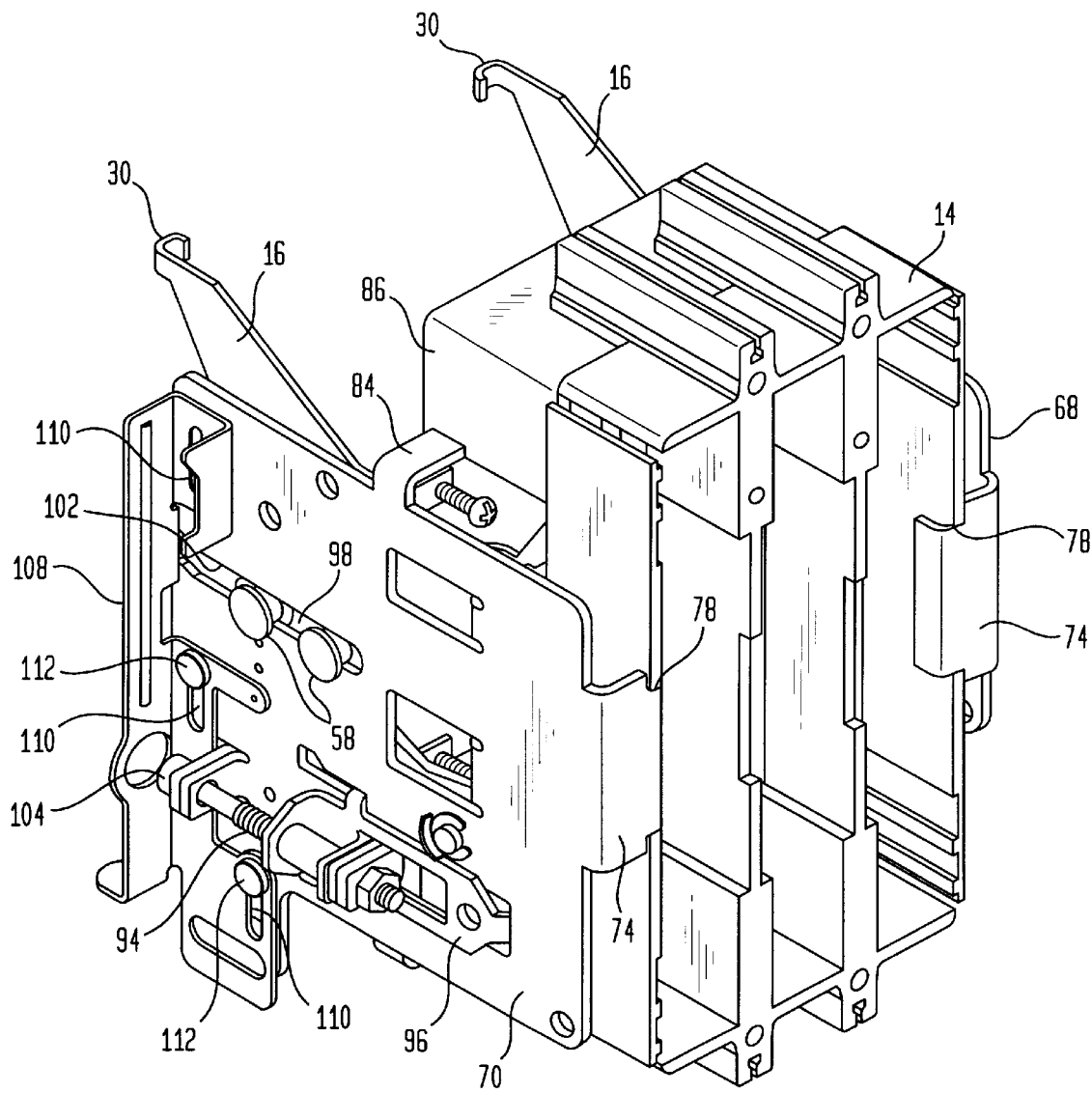
FIG. 6 is a rear perspective view of the movement structure of FIG. 5.

The draw brackets 68 and 70 provide support for the circuit breaker 12 together with circuit breaker guide brackets 16. As best shown in FIGS. 5 and 6, the active draw bracket 70 includes drive structure including a drive screw 94 and a slider 96 which actuates draw arms 98 and 100. Draw arm 98 is associated with the active draw bracket 70 while draw arm 100 is associated with the passive draw bracket 68. The draw arms 68 and 70 are operatively associated via a transfer shaft 102 (FIG. 1). The structure and operation of the drive structure and draw arms of the invention are conventional and are of the type disclosed in U.S. Pat. No. 5,837,949, the content of which is hereby incorporated into the present specification by reference. Thus, movement structure 10 operates in the following manner with reference to FIGS. 4–6. It is noted that for clarity of illustration, the circuit breaker 12 is not shown coupled to the guide brackets 16 in FIGS. 5 and 6.

First, the circuit breaker 12 is aligned with the draw brackets 68 and 70. Next, the circuit breaker 12 is guided into slots 102 of the draw brackets 68 and 70 until the guide posts 58 are resting in their free position in the draw bracket slots 102. The drive screw 94 is then rotated clockwise by engaging the head 104 thereof with a tool to insert or draw the circuit breaker 12 into the plug-in base 14. Rotating the drive screw 94 displaces the slider 96 so as to rotate the draw arms 98 and 100 upwardly. Thus, as the draw arms 98 and 100 rotate, they capture the two forward guide posts 58 in the two draw bracket slots 106 and thereby draw or pull-in the circuit breaker 12 into the plug-in base 14 so as to cause the copper stabs 64 to be inserted or drawn into the copper contact jaws 66 of the plug-in base 14.

To remove, draw-out or otherwise withdraw the circuit breaker 12 from the plug-in base 14, the head 104 of the drive screw 94 is rotated counter-clockwise so as to cause the drive screw 94 to rotate causing the slider 96 to travel rearwardly or outwardly from the draw brackets 68 and 70. This causes the draw arms 98 and 100 to rotate downwardly which draws-out and disconnects the circuit breaker 12 from the plug-in base 14.

In accordance with the principles of the invention, the active draw bracket 70 of the movement structure 10 further includes a movable structure coupled thereto so as to be moved in a linear manner between first, second and third positions while maintaining the movable structure in one of the three positions. In the illustrated embodiment and as best shown in FIG. 6, the movable structure comprises a rail 108 mounted on the front of active draw bracket 70. The rail 108 includes slots 110 which receive associated guide members in the form of shoulder rivets 112 extending from the active draw bracket 70. Thus, the rail 108 is permitted to slide vertically with respect to the rivets 112. A three position holding structure permits movement of the rail 108 between three positions while maintaining the rail 108 in a given position. In the preferred embodiment and as best shown in FIGS. 7A and 7B, the holding structure comprises a small protrusion 114 on the rail 108 which forcibly engages one of three small indentations 116 defined in the active draw bracket 70. An indentation 116 corresponds to a certain one of the three positions of the rail 108. As the rail 108 is moved from one of the three positions to another position, the protrusion 114 disengages one of the indentations 116 and engages another indentation.

With reference to FIGS. 7A and 7B, in a first position of the rail, the circuit breaker 12 may be removed from or installed in the draw brackets 68 and 70 of the plug-in base 14. A clearance cut-out 118 in the rail 108 is in a position to clear the rollers 58 on guide brackets 16. As the circuit breaker 12 is removed from the draw brackets 68 and 70, the rollers 58 pass through the clearance cut-out 118. In this first position, a drive tool access hole 120 in the rail 108 is not aligned with the head 104 of the drive screw 94 so that the drive structure may not be operated.

With reference to FIGS. 8A and 8B, the second position of the rail 108 defines a locked position of the movement structure 10. In the second position, neither the clearance cut-out 118 nor the drive tool access hole 120 is in alignment with its respective component. Therefore, the circuit breaker 12 may not be inserted into or withdrawn from the draw bracket assembly (draw brackets 68 and 70) and the drive structure cannot be operated. Cooperating locking structure in the form of an aperture 122 in rail 108 and an aperture 124 in the active draw bracket 70 are aligned in the second position, allowing the structure to be locked with a locking member such as a bolt lock inserted through the apertures 122 and 124 for maintenance safety and for theft prevention.

With reference to FIGS. 9A and 9B, in a third position of the rail 108, the clearance cut-out 1 18 is not aligned with the path of the rollers 58, thus, the circuit breaker 12 may not be completely removed from the draw brackets 68 and 70 of the draw bracket assembly. The drive tool access hole 120 in the rail 108 is aligned with the head 94 of the drive screw 94 permitting the drive structure to be operated to insert the circuit breaker 12 into or withdraw the circuit breaker 12 from the plug-in base 14. This arrangement advantageously prevents the circuit breaker 12 from dropping after it is withdrawn from the plug-in base 14 and is released from the draw brackets 68 and 70 of the draw bracket assembly. This is especially useful in situation where plug-in bases 14 are mounted with the contact jaws 66 (FIG. 5) angled downwardly, in which case a disengaged circuit breaker 12 would otherwise drop from the plug-in base 14.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A circuit breaker movement structure for use with a circuit breaker to move the circuit breaker to be connected with or be disconnected from a circuit breaker connecting apparatus, the movement structure comprising:

a draw bracket assembly constructed and arranged to be mounted to the circuit breaker connecting apparatus, a guide assembly constructed and arranged to be mounted to the circuit breaker, said draw bracket assembly including drive structure constructed and arranged to be actuated to engage said guide assembly and cause the circuit breaker to move with respect to the circuit breaker connecting apparatus, said draw bracket assembly including a movable structure coupled thereto so as to be moved in a linear manner between first, second, and third positions while maintaining said movable structure in one of said positions, said movable structure being constructed and arranged such that:

in said first position, said movable structure permits the circuit breaker to be initially connected with or be disconnected from the circuit breaker connecting apparatus, and prevents actuation of said drive structure, in said second position, said movable structure prevents the circuit breaker to be connected with or be disconnected from the circuit breaker connecting apparatus, and prevents actuation of said drive structure, and in said third position, said moveable structure permits the circuit breaker to be connected with or be disconnected from the circuit breaker connecting apparatus but prevents the circuit breaker from being completely disengaged with respect to said draw bracket assembly, and said movable structure permits actuation of said drive structure.

2. The circuit breaker movement structure according to claim 1, wherein said draw bracket assembly includes a pair of draw brackets disposed adjacent to respective sides of the circuit breaker connecting apparatus when mounted thereto, said movable structure including a rail mounted on one of said draw brackets for linear movement with respect to said one draw bracket.

3. The circuit breaker movement structure according to claim 2, wherein said rail includes an elongated slot therein and said one draw bracket includes a guide member extending through said slot such that movement of said movable structure includes movement of said slot with respect to said guide member.

4. The circuit breaker movement structure according to claim 3, wherein said guide member is a rivet.

5. The circuit breaker movement structure according to claim 2, wherein said rail and said one draw bracket include cooperating holding structure constructed and arranged to temporarily hold said rail with respect to said one draw bracket in each of said first, second and third positions.

6. The circuit breaker movement structure according to claim 5, wherein said cooperating holding structure comprises a protrusion extending from said rail and three associated indentations in said one draw bracket, an indentation being associated with each of said first, second and third positions of said movable member such that as said movable member is moved between said first, second and third positions, said protrusion disengages from one of said indentations and engages with another of said indentations.

7. The circuit breaker movement structure according to claim 2, further cooperating locking structure in said rail and said one draw bracket constructed and arranged to permit said movable structure to be locked in said second position.

8. The circuit breaker movement structure according to claim 7, wherein said cooperating locking structure includes an aperture in said rail and an aperture in said one draw bracket, said apertures being aligned when said movable member is in said second position there of so as to receive a locking member.

9. The circuit breaker movement structure according to claim 1, wherein said guide assembly includes at least one roller disposed adjacent to a respective side of the circuit breaker when mounted thereto, said rail including a cut-out therein constructed and arranged to permit said roller to pass therethrough such that when said movable structure is in said first position, said cut-out aligns with said roller permitting said roller to pass through said cut-out, and when said movable structure is in said second and third positions, said cut-out is not aligned with said roller preventing said roller from passing through said cut-out.

10. The circuit breaker movement structure according to claim 1, wherein said movable structure includes a drive tool access hole to access and actuate said drive structure, said access hole being constructed and arranged such that when said movable structure is in said third position, said access hole is aligned with said drive structure such that said drive structure may be actuated and when said movable structure is in said first and second positions, said access hole is not aligned with said drive structure preventing actuation of said drive structure.

11. The circuit breaker movement structure according to claim 10, wherein said drive structure includes a drive screw having a screw head, said screw head being aligned with said access hole in said third position of said movable structure to permit actuation of said drive screw by engaging said screw head through said access hole.

12. A circuit breaker movement system for use with a circuit breaker to move the circuit breaker to be connected with or be disconnected from a circuit breaker connecting apparatus, the system comprising:
    a circuit breaker,
    a guide assembly mounted to said circuit breaker,
    a circuit breaker connecting apparatus,
    a draw bracket assembly mounted to said circuit breaker connecting apparatus, said draw bracket assembly including drive structure constructed and arranged to be actuated to engage said guide assembly and cause the circuit breaker to move with respect to the circuit breaker connecting apparatus, said draw bracket assembly including a movable structure coupled thereto so as to be moved in a linear manner between first, second, and third positions while maintaining said movable structure in one of said positions, said movable structure being constructed and arranged such that:
    in said first position, said movable structure permits the circuit breaker to be initially connected with or be disconnected from the circuit breaker connecting apparatus, and prevents actuation of said drive structure,
    in said second position, said movable structure prevents the circuit breaker to be connected with or be disconnected from the circuit breaker connecting apparatus, and prevents actuation of said drive structure, and
    in said third position, said moveable structure permits the circuit breaker to be connected with or be disconnected from the circuit breaker connecting apparatus but prevents the circuit breaker from being completely disengaged with respect to said draw bracket assembly, and said movable structure permits actuation of said drive structure.

13. The system according to claim 12, wherein said draw bracket assembly includes a pair of draw brackets disposed adjacent to respective sides of the circuit breaker connecting apparatus when mounted thereto, said movable structure including a rail mounted on one of said draw brackets for linear movement with respect to said one draw bracket.

14. The system according to claim 13, wherein said rail includes an elongated slot therein and said one draw bracket includes a guide member extending through said slot such that movement of said movable structure includes movement of said slot with respect to said guide member.

15. The system according to claim 14, wherein said guide member is a rivet.

16. The system according to claim 13, wherein said rail and said one draw bracket include cooperating holding structure constructed and arranged to temporarily hold said rail with respect to said one draw bracket in each of said first, second and third positions.

17. The system according to claim 16, wherein said cooperating holding structure comprises a protrusion extending from said rail and three associated indentations in said one draw bracket, an indentation being associated with each of said first, second and third positions of said movable member such that as said movable member is moved between said first, second and third positions, said protrusion disengages from one of said indentations and engages with another of said indentations.

18. The system according to claim 13, further cooperating locking structure in said rail and said one draw bracket constructed and arranged to permit said movable structure to be locked in said second position.

19. The system according to claim 18, wherein said cooperating locking structure includes an aperture in said rail and an aperture in said one draw bracket, said apertures being aligned when said movable member is in said second position thereof as to receive a locking member.

20. The system according to claim 12, wherein said guide assembly includes at least one roller disposed adjacent to a respective side of the circuit breaker when mounted thereto, said rail including a cut-out therein constructed and arranged to permit said roller to pass therethrough such that when said movable structure is in said first position, said cut-out aligns with said roller permitting said roller to pass through said cut-out, and when said movable structure is in said second and third positions, said cut-out is not aligned with said roller preventing said roller from passing through said cut-out.

21. The system according to claim 12, wherein said movable structure includes a drive tool access hole to access and actuate said drive structure, said access hole being constructed and arranged such that when said movable structure is in said third position, said access hole is aligned with said drive structure such that said drive structure may be actuated and when said movable structure is in said first and second positions, said access hole is not aligned with said drive structure preventing actuation of said drive structure.

22. The system according to claim 19, wherein said drive structure includes a drive screw having a screw head, said screw head being aligned with said access hole in said third position of said movable structure to permit actuation of said drive screw by engaging said screw head through said access hole.

23. A method of controlling operation of a circuit breaker movement structure for use with a circuit breaker to move the circuit breaker to be connected with or be disconnected from a circuit breaker connecting apparatus, the movement structure comprising:
    a draw bracket assembly mounted to the circuit breaker connecting apparatus,
    a guide assembly mounted to the circuit breaker,
    said draw bracket assembly including drive structure constructed and arranged to be actuated to engage said guide assembly and cause the circuit breaker to move with respect to the circuit breaker connecting apparatus, said draw bracket assembly including a movable structure coupled thereto so as to be moved in a linear manner between first, second, and third positions while maintaining said movable structure in one of said positions, the method including:

permitting the circuit breaker to be initially connected with or be disconnected from the circuit breaker connecting apparatus and preventing actuation of said drive structure, when said movable structure is in a first position thereof, preventing the circuit breaker to be connected with or be disconnected from the circuit breaker connecting apparatus and preventing actuation of said drive structure, when said movable structure is in a second position thereof, and permitting the circuit breaker to be connected with or be disconnected from the circuit breaker connecting apparatus but preventing the circuit breaker from being completely disengaged with respect to said draw bracket assembly and permitting actuation of said drive structure, when said movable structure is in a third position thereof.

* * * * *